United States Patent
Zhang et al.

(10) Patent No.: US 11,472,641 B2
(45) Date of Patent: Oct. 18, 2022

(54) MATERIAL DROPPING METHOD, CONTROL DEVICE, DROPPING APPARATUS, AND SYSTEM

(71) Applicant: SHANGHAI QUICKTRON INTELLIGENT TECHNOLOGY CO., LTD, Shanghai (CN)

(72) Inventors: Heng Zhang, Shanghai (CN); Zheting Zhou, Shanghai (CN); Jingchun Zhou, Shanghai (CN)

(73) Assignee: SHANGHAI QUICKTRON INTELLIGENT TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 17/442,389

(22) PCT Filed: Apr. 19, 2019

(86) PCT No.: PCT/CN2019/083386
§ 371 (c)(1),
(2) Date: Sep. 23, 2021

(87) PCT Pub. No.: WO2019/134717
PCT Pub. Date: Jul. 11, 2019

(65) Prior Publication Data
US 2022/0089386 A1    Mar. 24, 2022

(30) Foreign Application Priority Data
Apr. 2, 2019   (CN) .......................... 201910261394.9

(51) Int. Cl.
*G06F 7/00*     (2006.01)
*B65G 65/00*    (2006.01)

(52) U.S. Cl.
CPC .... *B65G 65/005* (2013.01); *B65G 2203/0233* (2013.01)

(58) Field of Classification Search
CPC ...................... B65G 65/005; B65G 2203/0233
(Continued)

(56) References Cited

U.S. PATENT DOCUMENTS 9,486,921 B1 * 11/2016 Straszheim ............ B25J 9/1679
2007/0059132 A1   3/2007 Akamatsu et al.

FOREIGN PATENT DOCUMENTS

CN            1927673 A        3/2007
CN          105466429 A        4/2016
(Continued)

OTHER PUBLICATIONS

First Chinese Office Action & Search Report (w/ English Translation) for corresponding Chinese Application No. CN 201910261394. 9, dated Nov. 4, 2019—17 pages.
(Continued)

*Primary Examiner* — Yolanda R Cumbess
(74) *Attorney, Agent, or Firm* — Dority & Manning, P.A.

(57) ABSTRACT

A material placement method is disclosed, comprising: determining a target placement area, the target placement area being correspondingly provided with a target material storage apparatus; determining a movement track based on a current placement area and the target placement area; when each placement area which the movement track passes through is not reserved for occupancy, selecting a material placement means based on a positional relationship between the movement track and the target material storage apparatus; placing a material in the target material storage apparatus based on the selected material placement means.

19 Claims, 11 Drawing Sheets

(58) Field of Classification Search
USPC .......................................... 700/213–214, 228
See application file for complete search history.

(56) References Cited

FOREIGN PATENT DOCUMENTS

| | | |
|---|---|---|
| CN | 106044253 A | 10/2016 |
| CN | 106483889 A | 3/2017 |
| CN | 106829374 A | 6/2017 |
| CN | 107450548 A | 12/2017 |
| CN | 108382783 A | 8/2018 |
| CN | 108838732 A | 11/2018 |
| CN | 208377728 U | 1/2019 |
| CN | 109292472 A | 2/2019 |
| CN | 109305502 A | 2/2019 |

OTHER PUBLICATIONS

Internationl Search Report (w/ English Translation) for corresponding PCT Application No. PCT/CN2019/083386 dated Dec. 27, 2019, 8 pages.
First Chinese Office Action (w/ English Translation) for corresponding Chinese Application No. 2019102613949, 6 pages.
Search Report (w/ English Translation) for corresponding Chinese Application No. 2019102613949, 4 pages.

* cited by examiner

"MATERIAL DROPPING METHOD, CONTROL DEVICE, DROPPING APPARATUS, AND SYSTEM"

CROSS-REFERENCE TO RELATED APPLICATIONS

The present application is a national stage application of PCT International Application No. PCT/CN2019/083386, filed on Apr. 19, 2019, which, in turn, claims priority to Chinese patent application, No. 201910261394.9, entitled "Material Dropping Method, Apparatus, Dropping System, and Material Control Device", filed with the Chinese Patent Office on Apr. 2, 2019, both of which are hereby incorporated by reference in their entirety for all purposes.

TECHNICAL FIELD

The present application relates to a technical field of material (such as, ordered items) dropping, and in particularly relates to a material dropping method, a material dropping control device (used in a warehouse setting for moving items), a material dropping apparatus, and a material dropping system.

BACKGROUND

At present, in a material dropping process, a material dropping trolley (that is, Automated Guided Vehicle, AGV) moves to the side of a material storage device and stops for material dropping. After the material dropping is completed, the trolley is restarted to move. The process of stopping and restarting the trolley takes time, resulting in slow material dropping speed and low efficiency. Meanwhile, in large workshops, there exist a large number of material dropping trolleys which work orderly. However, when one of the material dropping trolleys breaks down and stops moving, the broken-down material dropping trolley tends to collide with other material dropping trolleys, and the orderliness of material dropping is destroyed.

SUMMARY

In some embodiments of the present application, a material dropping method, a material dropping control device, a material dropping apparatus, and a material dropping system are provided to solve the above technical problems in the existing technology.

In a first aspect of the present application, a material dropping method is provided, including:

selecting a target dropping area from a plurality of dropping areas, wherein the target dropping area corresponds to a target material storage device selected from a plurality of material storage devices used for storing materials;

determining a motion trajectory of a material dropping apparatus based on locations of a current dropping area and the target dropping area; wherein the motion trajectory is a virtual path comprised of all dropping areas through which the material dropping apparatus passes; the current dropping area is a dropping area where the material dropping apparatus is currently located; the target dropping area is a dropping area corresponding to the material storage device where the material dropping apparatus will put or drop the materials;

selecting a material dropping manner based on a positional relationship between the motion trajectory and the target material storage device, when respective dropping areas through which the motion trajectory passes are not occupied by reservation; and dropping materials into the target material storage device based on the selected material dropping manner.

In a first implementation of the first aspect of the present application, the motion trajectory of the material dropping apparatus based on the current dropping area where the material dropping apparatus is located is determined, and the target dropping area includes:

when the current dropping area where the material dropping apparatus is located and the target dropping area are adjacent, the motion trajectory of the material dropping apparatus passing through the current dropping area, the target dropping area, and an end dropping area where the motion of the material dropping apparatus stops.

With reference to the first implementation of the first aspect, in a second implementation of the present application, selecting the material dropping manner based on the positional relationship between the motion trajectory and the target material storage device, when respective dropping areas through which the motion trajectory passes are not occupied by reservation, includes:

judging whether the target dropping area and the end dropping area where the motion of the material dropping apparatus stops are occupied by reservation;

selecting the material dropping manner to be a first linear dropping manner, when both the target dropping area and the end dropping area are not occupied by reservation, and when the motion trajectory is parallel to a material dropping hole of the material storage device;

wherein the first linear dropping manner is: controlling the material conveying device of the material dropping apparatus to drop the materials into the target material storage device while passing over the target material storage device, the material conveying device drops the materials into the target material storage device as the material dropping apparatus moves from the current dropping area to the end dropping area.

With reference to the second implementation of the first aspect, in a third implementation of the present application, after judging whether the target dropping area and the end dropping area where the motion of the material dropping apparatus stops are occupied by reservation, the method further includes:

selecting the material dropping manner to be a second linear dropping manner, when the end dropping area is occupied by reservation, the target dropping area is not occupied by reservation, and when the motion trajectory is parallel to a material dropping hole of the material storage device;

wherein the second linear dropping manner is: controlling the material conveying device to drop the materials into the target material storage device as the material dropping apparatus moves from the current dropping area to the target dropping area.

With reference to the first aspect, in a fourth implementation of the present application, determining the motion trajectory based on a current position and the target dropping area includes:

the motion trajectory passing through the current dropping area, a non-target dropping area, and the target dropping area, when there exists at least one non-target dropping area between the current dropping area and the target dropping area.

With reference to the fourth implementation of the first aspect, in the fifth implementation of the present application, selecting the material dropping manner based on the positional relationship between the motion trajectory and the target material storage device, when the respective dropping areas through which the motion trajectory passes are not occupied by reservation, includes:

judging whether the target dropping area and the non-target dropping area are occupied by reservation;

selecting the material dropping manner to be a rotary dropping manner, when both the target dropping area and the non-target dropping area are not occupied by reservation, and when the motion trajectory is perpendicular to a topology diagram comprised of material dropping holes of the respective material storage devices;

wherein the rotary dropping manner is: dropping, in the target dropping area, the materials into the target material storage device by controlling the material conveying device to rotate, when the material dropping manner is the rotary dropping manner.

With reference to any one of the above implementations of the first aspect, in a sixth implementation of the present application, before selecting the material dropping manner based on the positional relationship between the motion trajectory and the target material storage device, when the respective dropping areas through which the motion trajectory passes are not occupied by reservation, the method further includes:

sending, by the material dropping apparatus, a reservation request for the material dropping apparatus to occupy the target dropping area to a server; and receiving, by the material dropping apparatus, an indication from the server to accept the reservation request, and to allow the material dropping apparatus to occupy the target dropping area.

In a second aspect, in an embodiment of the present application, a material dropping control device is provided, including:

a target dropping area determination module, used for selecting a target dropping area from a plurality of dropping areas wherein the target dropping area corresponds to a target material storage device selected from a plurality of material storage devices used for storing materials;

a motion trajectory determination module, used for determining a motion trajectory of a material dropping apparatus based on locations of a current dropping area and the target dropping area; wherein the motion trajectory is a virtual path comprised of all dropping areas through which the material dropping apparatus passes; the current dropping area is a dropping area where the material dropping apparatus is currently located; the target dropping area is a dropping area corresponding to the material storage device where the material dropping apparatus will put or drop the materials;

a material dropping manner determination module, used for selecting a material dropping manner based on a positional relationship between the motion trajectory and the target material storage device, when respective dropping areas through which the motion trajectory passes are not occupied by reservation; and a material dropping module, used for dropping materials into the target material storage device based on the selected material dropping manner.

With reference to the second aspect, in a first implementation of the present application, the motion trajectory determination module includes:

a first dropping area determination unit, used for: when the current dropping area and the target dropping area are adjacent, determining the motion trajectory passing through the current dropping area, the target dropping area, and an end dropping area where the motion of the material dropping apparatus stops.

With reference to the first implementation of the second aspect, in a second implementation of the present application, the material dropping manner determination module includes:

a first dropping area reservation judgement unit, used for judging whether the target dropping area and the end dropping area where the motion of the material dropping apparatus stops are occupied by reservation; and a first dropping manner determination unit, used for selecting the material dropping manner to be a first linear dropping manner, when both the target dropping area and the end dropping area are not occupied by reservation, and when the motion trajectory is parallel to a material dropping hole of the material storage device.

With reference to the second implementation of the second aspect, in a third implementation of the present application, the material dropping module includes:

a first material dropping unit, used for, when the material dropping manner is the first linear dropping manner, controlling the material conveying device of the material dropping apparatus to drop the materials into the target material storage device while passing over the target material storage device, the material conveying device drops the materials into the target material storage device as the material dropping apparatus moves from the current dropping area to the end dropping area.

With reference to the third implementation of the second aspect, in a fourth implementation, the material dropping manner determination module further includes:

a second dropping manner determination unit, used for selecting the material dropping manner to be a second linear dropping manner, when the end dropping area is occupied by reservation, the target dropping area is not occupied by reservation, and when the motion trajectory is parallel to a material dropping hole of the material storage device.

With reference to the fourth implementation of the second aspect, in a fifth implementation, the material dropping module further includes:

a second material dropping unit, used for controlling the material conveying device to drop the materials into the target material storage device as the material dropping apparatus moves from the current dropping area to the target dropping area, when the material dropping manner is the second linear dropping manner.

With reference to the second aspect, in a sixth implementation of the present application, the motion trajectory determination module includes:

a second dropping area determination unit, used for the motion trajectory passing through the current dropping area, a non-target dropping area, and the target dropping area, when there exist at least a non-target dropping area between the current dropping area and the target dropping area.

With reference to the sixth implementation of the second aspect, in a seventh implementation, the material dropping manner determination module includes:

a second dropping area reservation judgement unit, used for judging whether the target dropping area and the non-target dropping area are occupied by reservation; and a third dropping manner determination unit used for selecting the material dropping manner to be a rotary dropping manner when both the target dropping area and the non-target dropping area are not occupied by reservation, and when the motion trajectory is perpendicular to a topology diagram comprised of material dropping holes of the respective material storage devices.

With reference to the seventh implementation of the second aspect, in an eighth implementation of the present application, the material dropping module includes.

a third material dropping unit, used for dropping, in the target dropping area, the materials into the target material storage device by controlling the material conveying device to rotate, when the material dropping manner is the rotary dropping manner.

With reference to any one of the above implementations of the second aspect, in a ninth implementation of the present application, the material dropping control device further includes:

a reservation request sending module, used for sending, by the material dropping apparatus, a reservation request for the material dropping apparatus to occupy the target dropping area to a server; and a reservation confirmation module, used for receiving, by the material dropping apparatus, an indication from the server to accept the reservation request, and to allow the material dropping apparatus to occupy the target dropping area if the target dropping area is not occupied by reservation.

In a third aspect, based on an embodiment of the present application, a material dropping apparatus is provided, including a moving base, a stand column, a material conveying device, and the material dropping control device of the second aspect;

an upper end and a lower end of the stand column are respectively connected to the material conveying device and the moving base, the material conveying device is used for dropping the materials into the material storage device.

In a fourth aspect, based on an embodiment of the present application, a material dropping system is provided, including:

a plurality of material storage devices, wherein each of the material storage devices corresponds to a dropping area:

a plurality of material dropping apparatuses of claim 18, wherein the plurality of material dropping apparatuses are used for moving to target dropping areas based on respective corresponding target tasks, and dropping materials into the target material storage devices; and a server used for receiving reservation requests for occupying the target dropping areas sent from respective material dropping apparatuses, recording corresponding request time, generating information for allowing occupying the target dropping areas or information for rejecting occupying the target dropping area based on respective request time, and sending the information for allowing occupying the target dropping areas or the information for rejecting occupying the target dropping area to the respective corresponding material dropping apparatuses.

Another technical solution in the above technical solutions has the following advantages or beneficial effects that in embodiments of the present application, a motion trajectory is determined based on a current dropping area and a target dropping area in a material dropping process. It is then determined whether respective dropping areas through which the motion trajectory passes are occupied by reservation. When they are not occupied by reservation, the problem of collision happening during material dropping is effectively avoided, and the safety of material dropping is improved.

The above summary is merely for the purpose of illustration, which is not intended for limitation in any way. In addition to the illustrative aspects, implementation manners, and characteristics described above, further aspects, implementations, and characteristics of the present application will be readily understood with reference to the accompanying drawings and following detailed description.

BRIEF DESCRIPTION OF THE DRAWINGS

In the drawings, unless otherwise specified, the same drawing numerals throughout a plurality of accompanying drawings refer to the same or similar parts or elements. The drawings are not necessarily drawn to scale. It should be understood that the drawings merely depict some embodiments disclosed based on the present application, and should not be construed as limiting the scope of the present application.

DETAILED DESCRIPTION

Hereinafter, only certain exemplary embodiments are briefly described. As those skilled in the art can realize that the described embodiments may be modified in various different ways without departing from the spirit or scope of the present application. Therefore, the accompanying drawings and description are regarded as illustrative rather than restrictive in nature.

Embodiment 1

Figure 10:
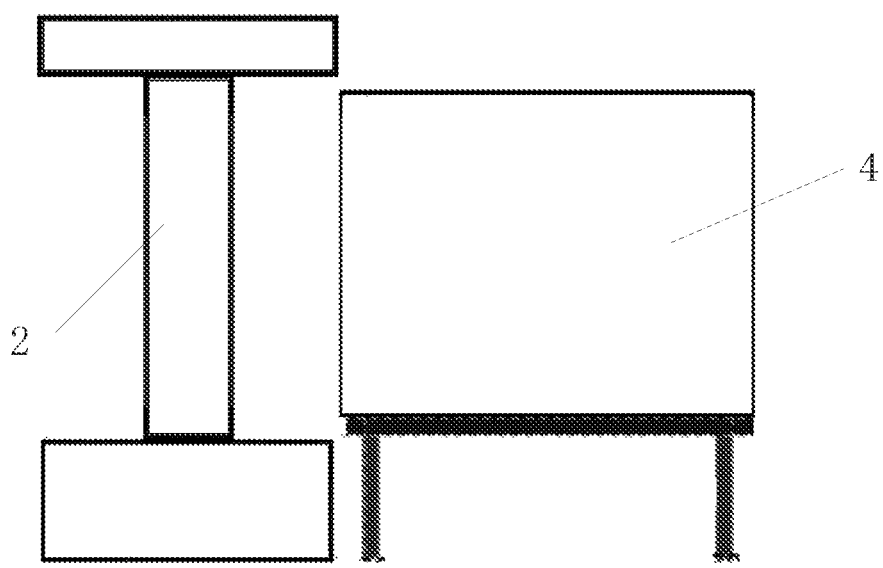
FIG. 10 is a side view of a material dropping apparatus and a material storage device provided by an embodiment of the present invention.
Figure 11:
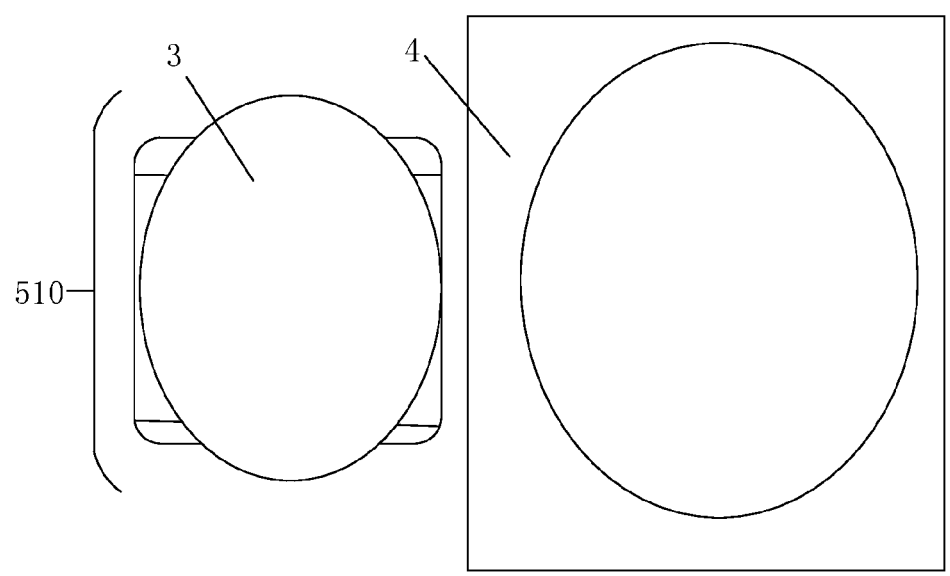
FIG. 11 is a top view of a material dropping apparatus and a material storage device provided by an embodiment of the present invention.

In another specific implementation, a material dropping apparatus 510 is provided as shown in FIG. 10 and FIG. 11. The material dropping apparatus 510 includes a moving base 1, a stand column 2, and a material conveying device 3, wherein an upper end of the stand column 2 is connected to the material conveying device 3 and a lower end of the stand column 2 is connected to the moving base 1, respectively; and the material dropping control device can be a chip and is arranged on the upper surface of the moving base 1. The moving base 1 is used for carrying the material conveying device 3 and is used for moving. The moving base 1 may be an Automated Guided Vehicle (AGV). The material dropping apparatus 510 can move to the sides of the material storage device 4. In order to facilitate material dropping, the material conveying device 3 is higher than the top surface of the material storage device 4.

Figure 12:
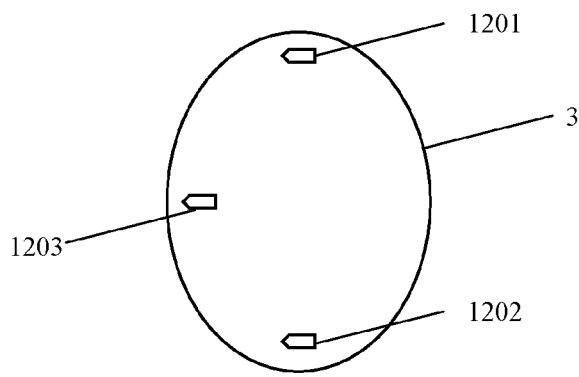
FIG. 12 shows a material conveying device with a first infrared sensor, a second infrared sensor, and a third infrared sensor.

In an example, as show in FIG. 12, the material conveying device 3 may include a belt pulley and a belt motor. While materials enter the belt pulley, the materials can be adjusted to the intermediate dropping position through a moving belt. Three infrared sensors can be arranged on the belt pulley. Two of the three infrared sensors are respectively arranged at the two ends of the belt movement direction, and are used for detecting whether the materials enter a conveying platform. The two infrared sensors are respectively the first infrared sensor 1201 and the second infrared sensor 1202. The third infrared sensor 1203 is arranged at the dropping position and is used for detecting whether the materials are conveyed to the dropping position. The dropping position can be preferably designed at the center of the belt pulley.

Embodiment 2

Figure 1:
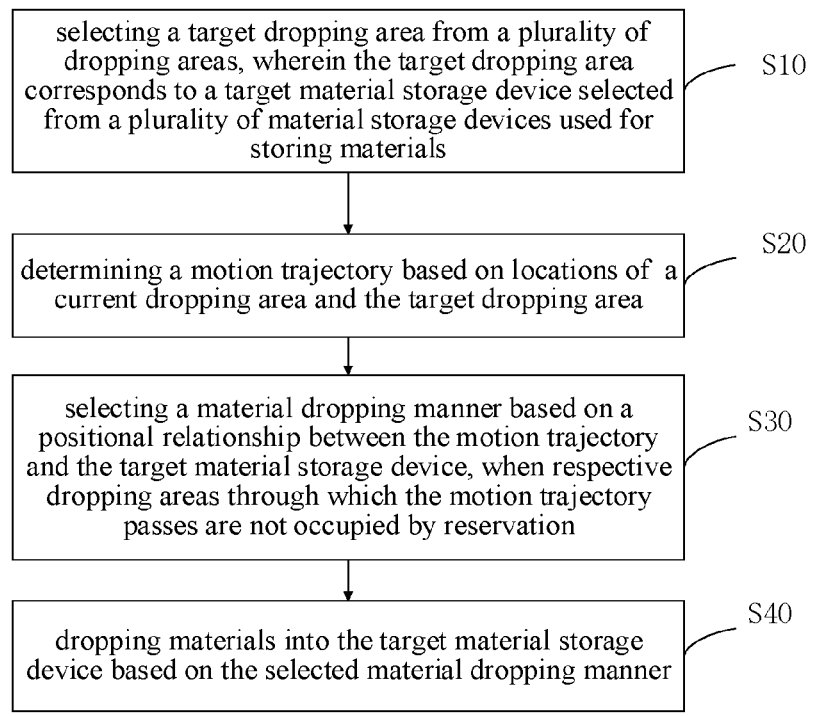
FIG. 1 is a schematic flow diagram showing a material dropping method provided by an embodiment of the present invention.

In a specific implementation, a material dropping method is provided. As shown in FIG. 1, the method includes:

S10: selecting a target dropping area from a plurality of dropping areas, wherein the target dropping area corresponds to a target material storage device selected from a plurality of material storage devices used for storing materials;

S20: determining a motion trajectory of a material dropping apparatus based on locations of a current dropping area and the target dropping area; wherein the motion trajectory is a virtual path comprised of all dropping areas through which the material dropping apparatus passes; the current dropping area is a dropping area where the material dropping apparatus is currently located: the target dropping area is a dropping area corresponding to the material storage device where the material dropping apparatus will put or drop the materials;

S30: selecting a material dropping manner based on a positional relationship between the motion trajectory of the material dropping apparatus and the target material storage device, when the respective dropping areas through which the motion trajectory passes are not occupied by reservation, wherein the material dropping manner is a linear dropping manner, when the motion trajectory of the material dropping apparatus is parallel to a topology diagram comprised of material dropping holes of the material storage devices corresponding to the respective dropping areas, or the material dropping manner is a rotary dropping manner, when the motion trajectory of the material dropping apparatus is perpendicular to the topology diagram comprised of the material dropping holes of the material storage devices: wherein the linear dropping manner is that the material dropping apparatus moves along the respective dropping areas, and puts the materials into respective passing the material storage devices while moving: the rotary dropping manner is that the material dropping apparatus stop in the dropping area for dropping the materials, and put the materials into the material storage devices by rotating a material conveying device on the material dropping apparatus;

S40: dropping the materials into the target material storage device based on the selected material dropping manner.

Figure 5:
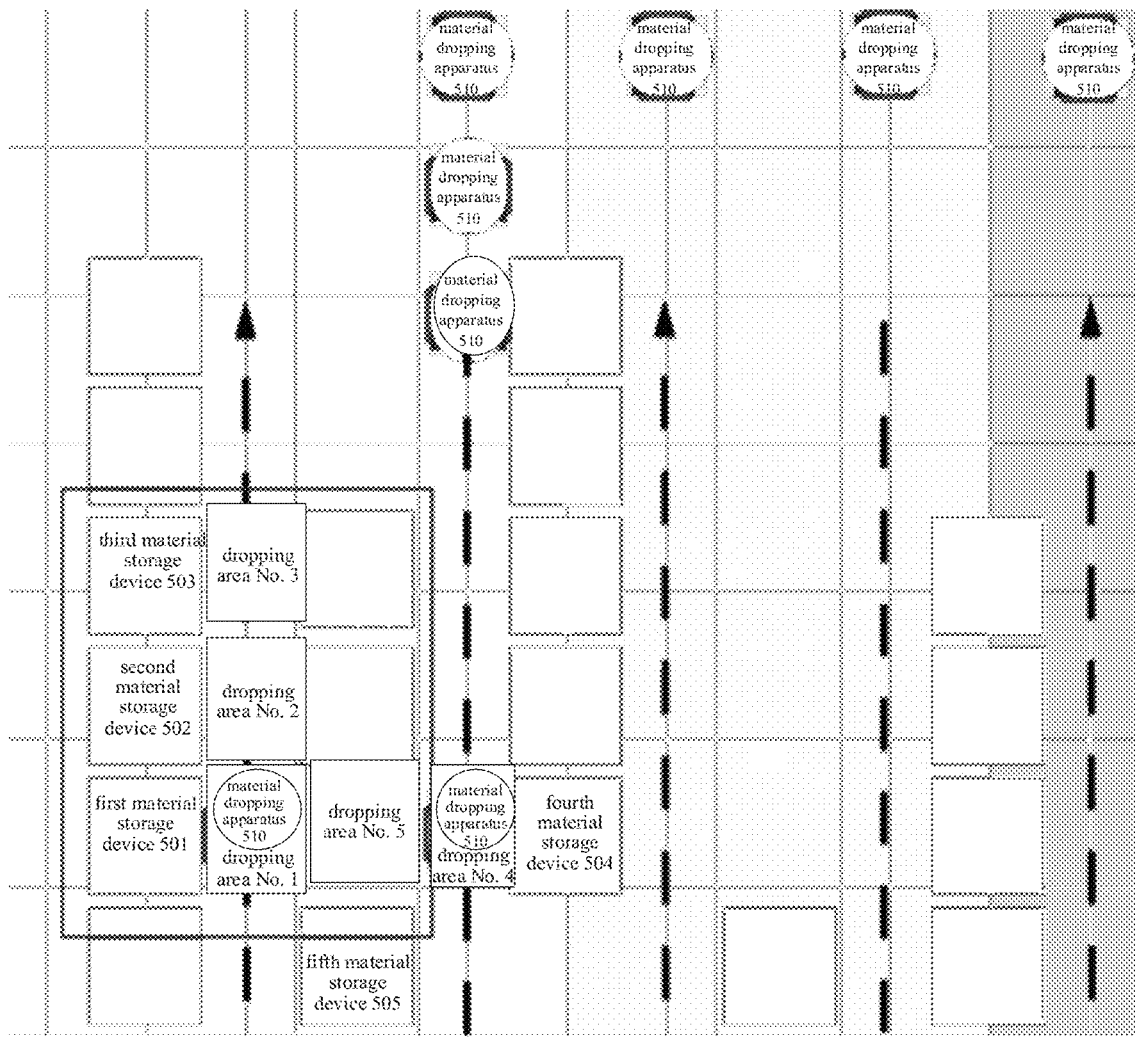
FIG. 5 is a schematic diagram showing a material dropping provided by an embodiment of the present invention.

In an example, as shown in FIG. 5 and FIG. 10, a plurality of material storage devices 4 and 501-505 are arranged longitudinally in multiple rows: a plurality of dropping areas 511-515 are arranged between two adjacent rows of material storage devices 4 and 501-505, and each dropping area 511-515 corresponds to a material storage device 4 and 501-505. A material dropping apparatus 510 moves in each dropping area 511-515, and puts materials into the material storage devices 4 and 501-505 in the movement process. It should be pointed out that the material storage devices 4 and 501-505 may be cage trolleys, electronic tags can be arranged on the surfaces of the cage trolleys to conveniently determine whether the materials in the cage trolleys are carried away by scanning the electronic tags. The number and distribution positions of the material storage devices 4 and 501-505 in each row are adjusted as needed. In order to facilitate the material dropping, the positions of the material storage devices 4 and 501-505 in each row correspond to or do not correspond to the positions of the material storage devices 4 and 501-505 in the adjacent row one by one. It is possible that there is no another row of corresponding material storage devices 4 and 501-505 in the opposite of a certain row of material storage devices 4 and 501-505. One of the dropping areas is selected as the target dropping area 511-515. The target dropping area 511-515 corresponds to the target material storage device 4 and 501-505. The current dropping area 511-515 is determined based on the current position, provided that the material dropping apparatus 510 can move from the current dropping area 511-515 to the target dropping area 511-515.

Figure 15:
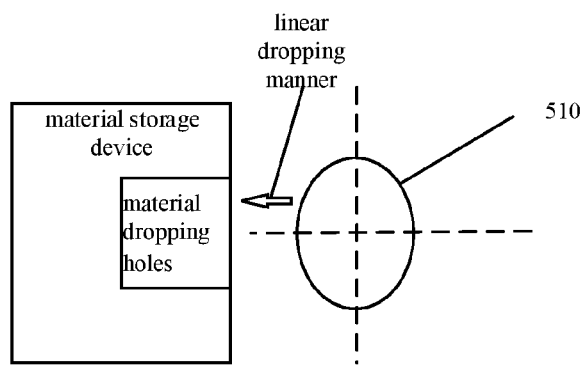
FIG. 15 shows a linear dropping manner.

The motion trajectory is determined based on the current dropping area of a material dropping apparatus and the target dropping area of the material dropping apparatus. The motion trajectory of the material dropping apparatus can include a virtual path comprised of all dropping areas through which a material dropping apparatus passes in the entire process of the moving of the material dropping apparatus from the current dropping area, passing the target dropping area, and stopping. For example, when the material dropping manner is the first linear dropping manner, as shown in FIG. 5 and FIG. 15, a dropping area No. 1 is the current dropping area, a dropping area No. 2 is the target dropping area, and a dropping area No. 3 is the end dropping area; the motion trajectory of the target material dropping apparatus passes through the dropping area No. 1, the dropping area No. 2, and the dropping area No. 3. Considering that a material dropping apparatus needs to perform a target task in the target dropping area, the material dropping apparatus may collide with other material dropping apparatuses passing the target dropping area. For example, when a material dropping apparatus performing a target task moves to the target dropping area, the target dropping area is already occupied by another material dropping apparatus, then a collision may occur. Therefore, it is necessary to judge whether respective dropping areas passed by the motion trajectory are occupied by reservation. If not, it means that the material dropping apparatus can perform the target task along the motion trajectory.

There are two types of material dropping manners. In the first situation, a material dropping apparatus moves along respective dropping areas, and puts materials into respective passing material storage devices while moving. In the second situation, a material dropping apparatus can only stop in the dropping area for dropping materials, and put materials into material storage devices by rotating a material conveying device on the material dropping apparatus. In the first situation, a material dropping apparatus usually moves along a certain row of dropping areas, and the motion trajectory of the material dropping apparatus is parallel to the topology diagram comprised of material dropping holes of respective material storage devices. The material dropping apparatus is controlled to put materials while moving. Thus, the material dropping time is saved, the time for stopping and restarting of the material dropping apparatus is eliminated, and the material dropping efficiency is improved. In the second situation, if there is an obstacle in a dropping area adjacent to the target dropping area, the material dropping apparatus can only enter the target dropping area for dropping materials from a direction perpendicular to the topology diagram comprised of the material dropping holes of the target material storage devices. The material dropping manner of the second situation solves the problem that the material dropping apparatus cannot enter the target dropping area for dropping materials when there is an obstacle(s) at two sides of the target dropping area. Meanwhile, the material dropping apparatus put materials into a material storage device by rotating a material conveying device while moving in the target dropping area, so that the material dropping efficiency is improved.

Figure 2:
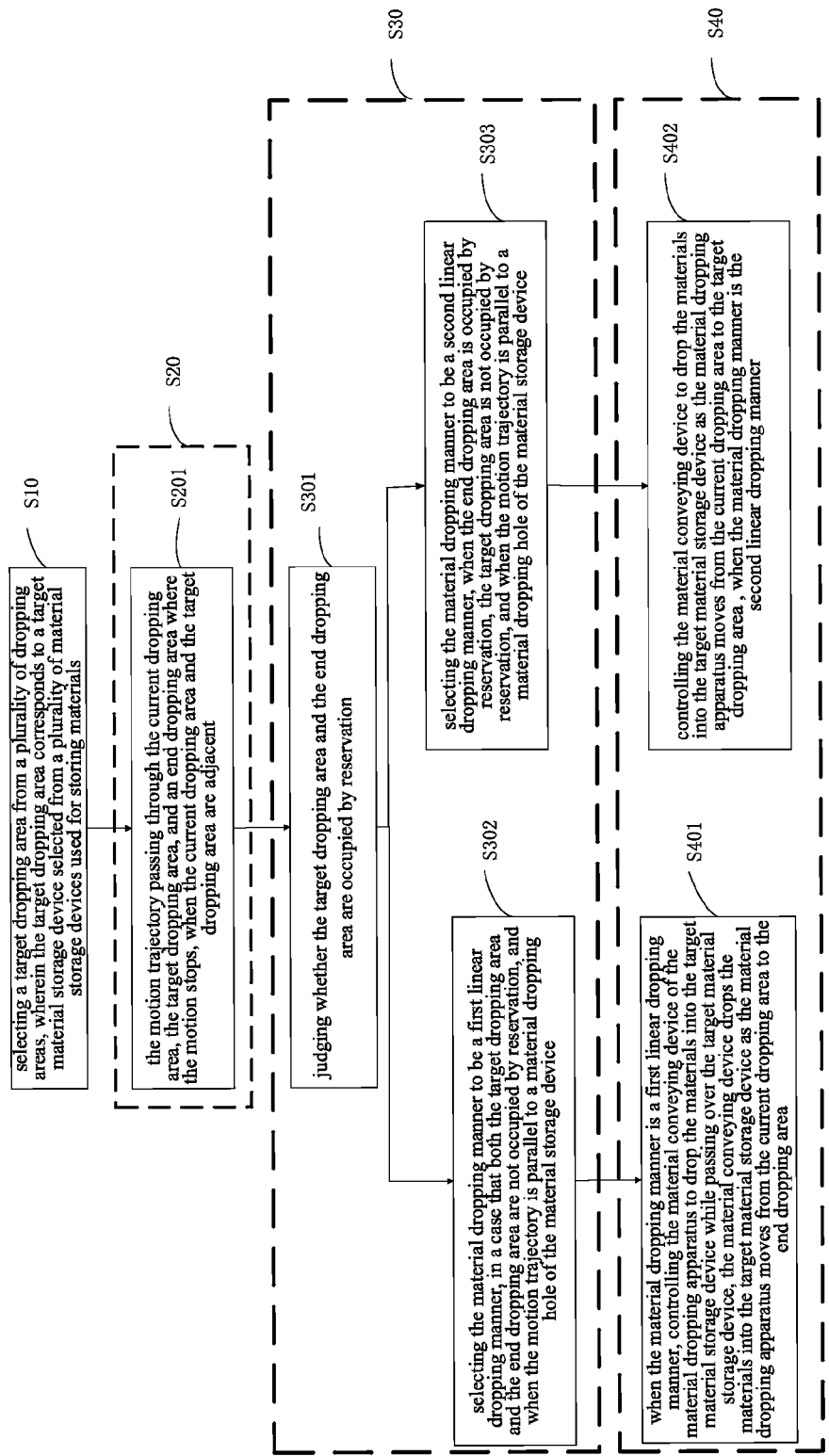
FIG. 2 is another schematic flow diagram showing a material dropping method provided by an embodiment of the present invention.

In an implementation, as shown in FIG. 2, S20 includes:

S201: when the current dropping area where the material dropping apparatus is located, and the target dropping area are adjacent, the motion trajectory passing through the current dropping area, the target dropping area, and an end dropping area where the motion of the material dropping apparatus stops.

In an example, as shown in FIG. 5, a dropping area No. 1 511 is the current dropping area, and corresponds to a first material storage device 501. A dropping area No. 2 512 is the target dropping area, and corresponds to a second material storage device 502. Further, a dropping area No. 3 513 is the end dropping area and corresponds to a third material storage device 503, that is, the position where a target material dropping apparatus stops. The motion trajectory of the target material dropping apparatus passes through the dropping area No. 1 511, the dropping area No. 2 512 and the dropping area No. 3 513. A dropping area No. 4 513 corresponds to a fourth material storage device 504 and a dropping area No. 5 515 corresponds to a fifth material storage device 505. The material dropping holes of material storage devices 501-505 are shown in FIG. 5. The material dropping holes of material storage devices 501-505 constitute a topology diagram.

In an implementation, as shown in FIG. 2, S30 includes:

S301: judging whether the target dropping area and the end dropping area where the motion of the material dropping apparatus stops are occupied by reservation;

S302: selecting the material dropping manner to be a first linear dropping manner, when both the target dropping area and the end dropping area are not occupied by reservation, and when the motion trajectory is parallel to a material dropping hole of the material storage device, wherein the first linear dropping manner is: controlling the material conveying device of the material dropping apparatus to drop the materials into the target material storage device while passing over the target material storage device, the material conveying device drops the materials into the target material storage device as the material dropping apparatus moves from the current dropping area to the end dropping area.

Figure 13:
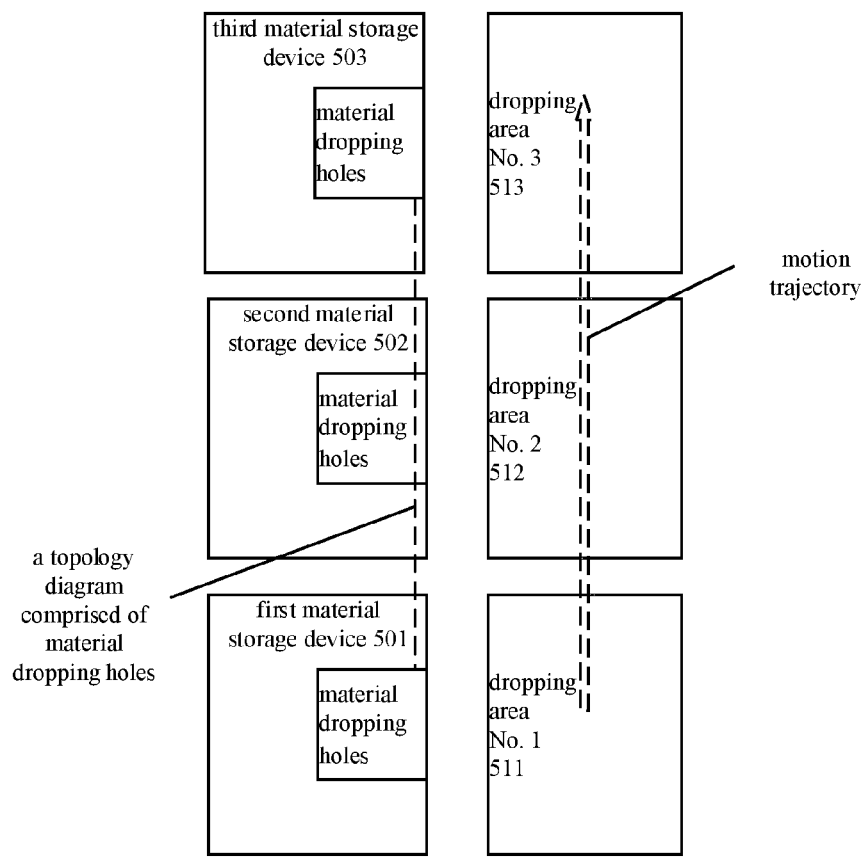
FIG. 13 shows that the motion trajectory is parallel to the topology diagram comprised of the material dropping holes of the material storage devices.

In an example, as shown in FIG. 5 and FIG. 13, it is determined whether the dropping area No. 2 and the dropping area No. 3 are occupied by reservation by another material dropping apparatus 510. Specifically, respective material dropping apparatuses 510 send reservation requests for the dropping area No. 2 and the dropping area No. 3 to a server. The server receives respective reservation requests, records corresponding request time, generates reservation allowing information based on the respective request time and sends the reservation allowing information to the target material dropping apparatus 510. The target material dropping apparatuses 510 receive the reservation allowing information, and analyze the positional relationship between the motion trajectory and the material dropping holes of the material storage devices. If the motion trajectory is parallel to the topology diagram comprised of the material dropping holes of the material storage devices, the material dropping manner is selected to be the first linear dropping manner. Certainly, if the server returns reservation rejection information to the target material dropping apparatus 510, then it is necessary to determine a target dropping area again.

In an implementation, as show in FIG. 2, S40 includes:

S401: when the material dropping manner is a first linear dropping manner, controlling the material conveying device of the material dropping apparatus to drop the materials into the target material storage device while passing over the target material storage device, the material conveying device drops the materials into the target material storage device as the material dropping apparatus moves from the current dropping area to the end dropping area.

In an example, as shown in FIG. 5, the target material dropping apparatus 510 does not stop in the entire process of moving from the dropping area No. 1 to the dropping area No. 3, and puts materials into the second material storage device while moving. The target material dropping apparatus 510 drops materials into the second material storage device by controlling a material conveying device, such as a belt.

In an implementation, as show in FIG. 2, after S301, the method further includes:

S303: selecting the material dropping manner to be a second linear dropping manner, when the end dropping area is occupied by reservation, the target dropping area is not occupied by reservation, and when the motion trajectory is parallel to a material dropping hole of the material storage device, wherein the second linear dropping manner is: controlling the material conveying device to drop the materials into the target material storage device as the material dropping apparatus moves from the current dropping area to the target dropping area.

In an example, if the dropping area No. 3 is occupied by reservation, the dropping area No. 2 is not occupied by reservation, the target material dropping apparatus 510 starts in the dropping area No. 1, moves to the dropping area No. 2 and stops in the dropping area No. 2.

In an implementation as show in FIG. 2, S40 includes:

S402: controlling the material conveying device to drop the materials into the target material storage device as the material dropping apparatus moves from the current dropping area to the target dropping area when the material dropping manner is the second linear dropping manner.

In an example, the target material dropping apparatus can also drop materials into a second material storage device in a braking process, so that the material dropping time is shortened and the material dropping efficiency is improved.

Figure 3:
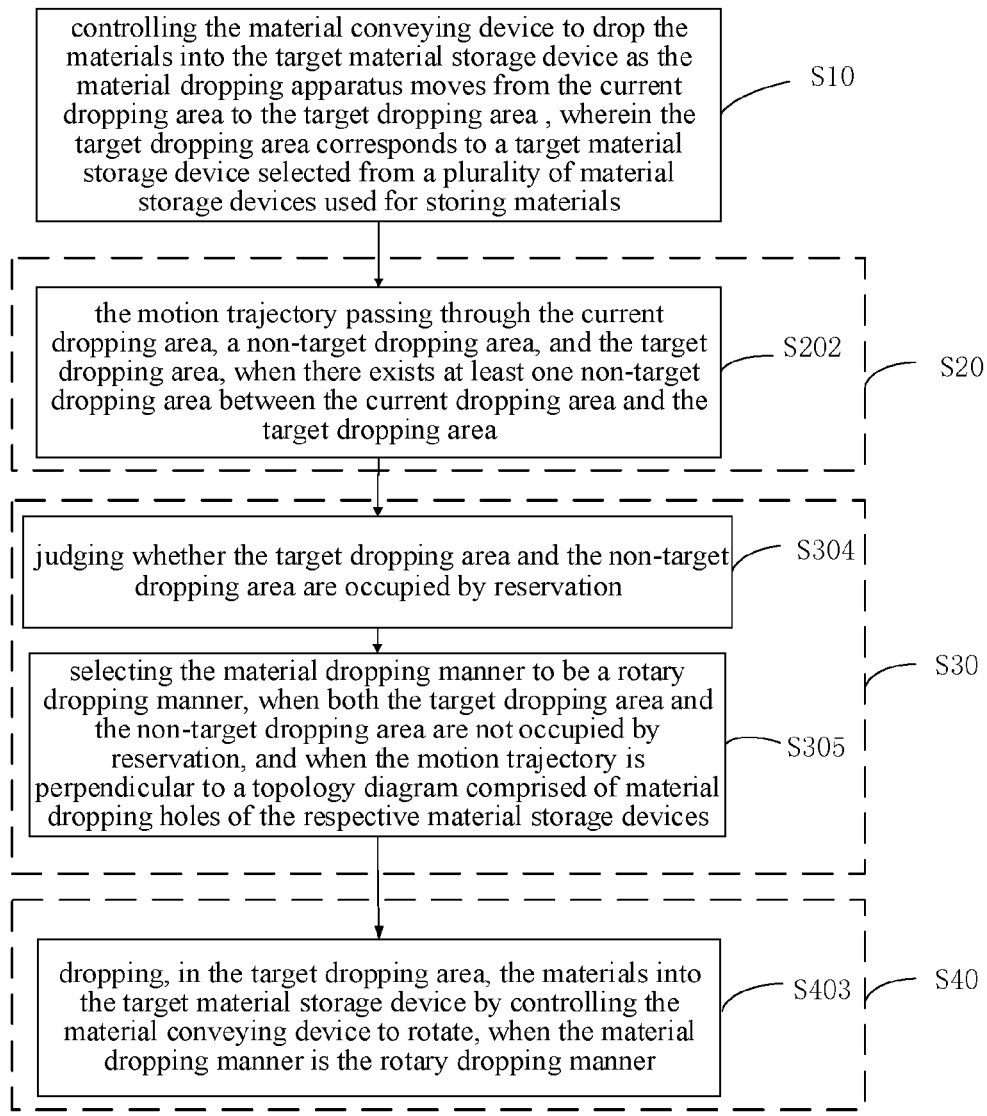
FIG. 3 is another schematic flow diagram showing a material dropping method provided by an embodiment of the present invention.

In an implementation, as show in FIG. 3, S20 includes:

S202: the motion trajectory passing through the current dropping area, a non-target dropping area, and the target dropping area, when there exists at least one non-target dropping area between the current dropping area and the target dropping area.

In an example, as shown in FIG. 5, the current dropping area is a dropping area No. 4, the target dropping area is a dropping area No. 1, and the non-target dropping area is a dropping area No. 5. The target material dropping apparatus 510 starts in the dropping area No. 4, passes through the dropping area No. 5, and stops in the dropping area No. 1.

In an implementation, as show in FIG. 3, S30 includes:

S304: judging whether the target dropping area and the non-target dropping area are occupied by reservation;

S305: selecting the material dropping manner to be a rotary dropping manner, when both the target dropping area and the non-target dropping area are not occupied by reservation, and when the motion trajectory is perpendicular to a topology diagram comprised of material dropping holes of the respective material storage devices.

Figure 14:
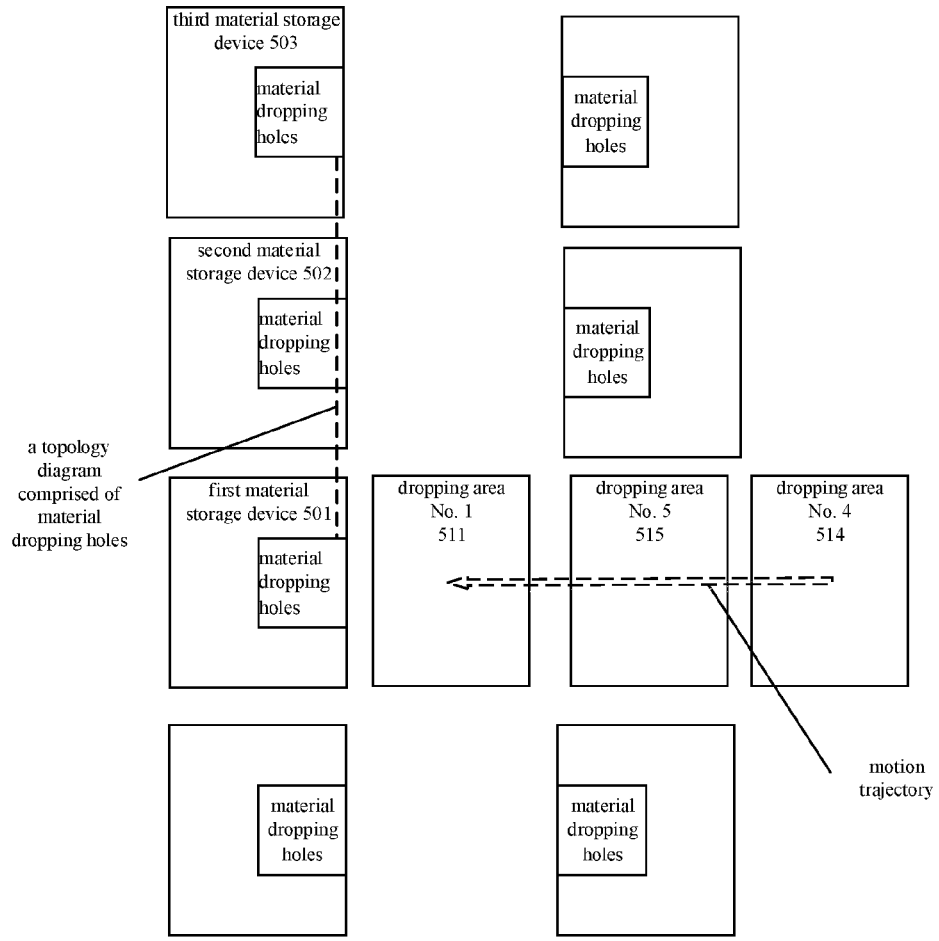
FIG. 14 shows that the motion trajectory is perpendicular to the topology diagram comprised of the material dropping holes of the material storage devices.

In an example, as shown in FIG. 14, it is determined whether the dropping area No. 1 and the dropping area No. 5 are occupied by reservation. When both the dropping area No. 1 and the dropping area No. 5 are not occupied by reservation, and the material dropping hole of the material storage device directly faces the target dropping apparatus, the target dropping apparatus enters the dropping area No. 1 from a direction perpendicular to the material dropping hole of the first material storage device. Due to the limited movement space of the target dropping apparatus in the dropping area No. 1, the material conveying device on the target dropping equipment is selected and rotated to drop materials into the first material storage device.

In an implementation, as show in FIG. 3, S40 includes:

S403: dropping, in the target dropping area, the materials into the target material storage device by controlling the material conveying device to rotate, when the material dropping manner is the rotary dropping manner.

Figure 16:
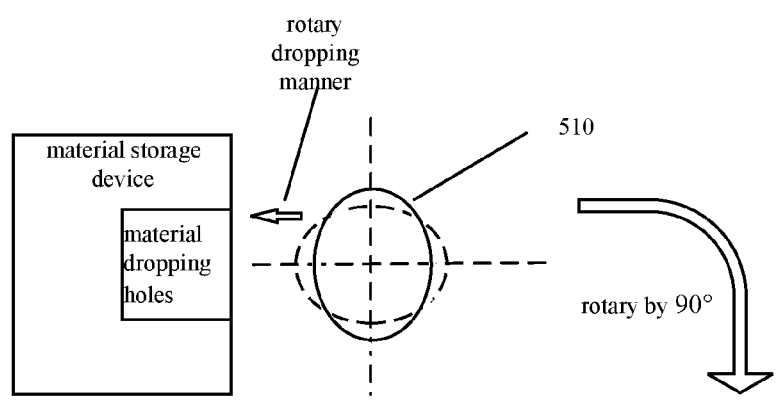
FIG. 16 shows a rotary dropping manner.

In an example, as shown in FIG. 16, in order to align the movement direction of a material conveying device with a first material storage device, the material conveying device needs to be rotated by 90 degrees. Only when the material conveying device is perpendicular to the direction of a row in which the first material storage device is located, materials can be effectively drop. The material dropping manner that a target material dropping apparatus controls a material conveying device to rotate while moving can not only save time, but also improve the material dropping efficiency.

Figure 4:
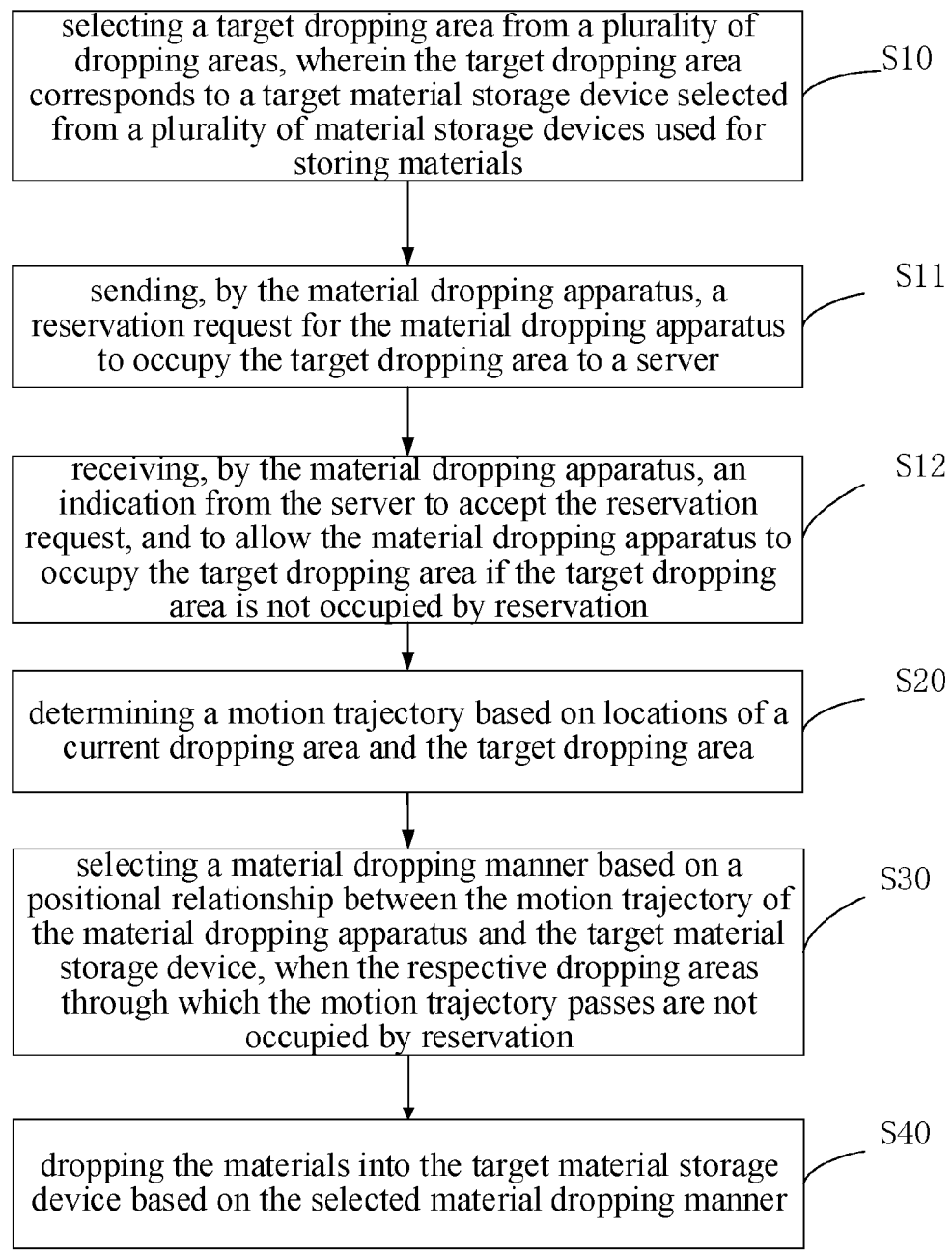
FIG. 4 is another schematic flow diagram showing a material dropping method provided by an embodiment of the present invention.

In an implementation, as shown in FIG. 4, after S10 and before S20, the method further includes:

S11: sending, by the material dropping apparatus, a reservation request for the material dropping apparatus to occupy the target dropping area to a server;

S12: receiving, by the material dropping apparatus, an indication from the server to accept the reservation request, and to allow the material dropping apparatus to occupy the target dropping area if the target dropping area is not occupied by reservation.

Embodiment 3

Figure 6:
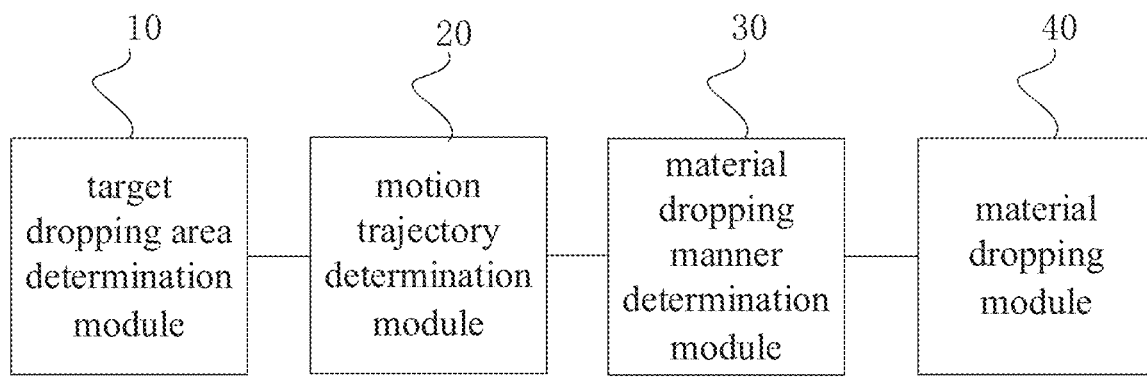
FIG. 6 is a structure diagram showing a material dropping control device provided by an embodiment of the present invention.

In another specific implementation, as shown in FIG. 6, a material dropping control device is provided, including:

a target dropping area determination module 10, used for selecting a target dropping area from a plurality of dropping areas, wherein the target dropping area corresponds to a target material storage device selected from a plurality of material storage devices used for storing materials:

a motion trajectory determination module 20, used for determining a motion trajectory of a material dropping apparatus based on locations of a current dropping area and the target dropping area:

a material dropping manner determination module 30, used for selecting a material dropping manner based on a positional relationship between the motion trajectory and the target material storage device, when respective dropping areas through which the motion trajectory passes are not occupied by reservation:

a material dropping module 40, used for dropping materials into the target material storage device based on the selected material dropping manner.

Figure 7:
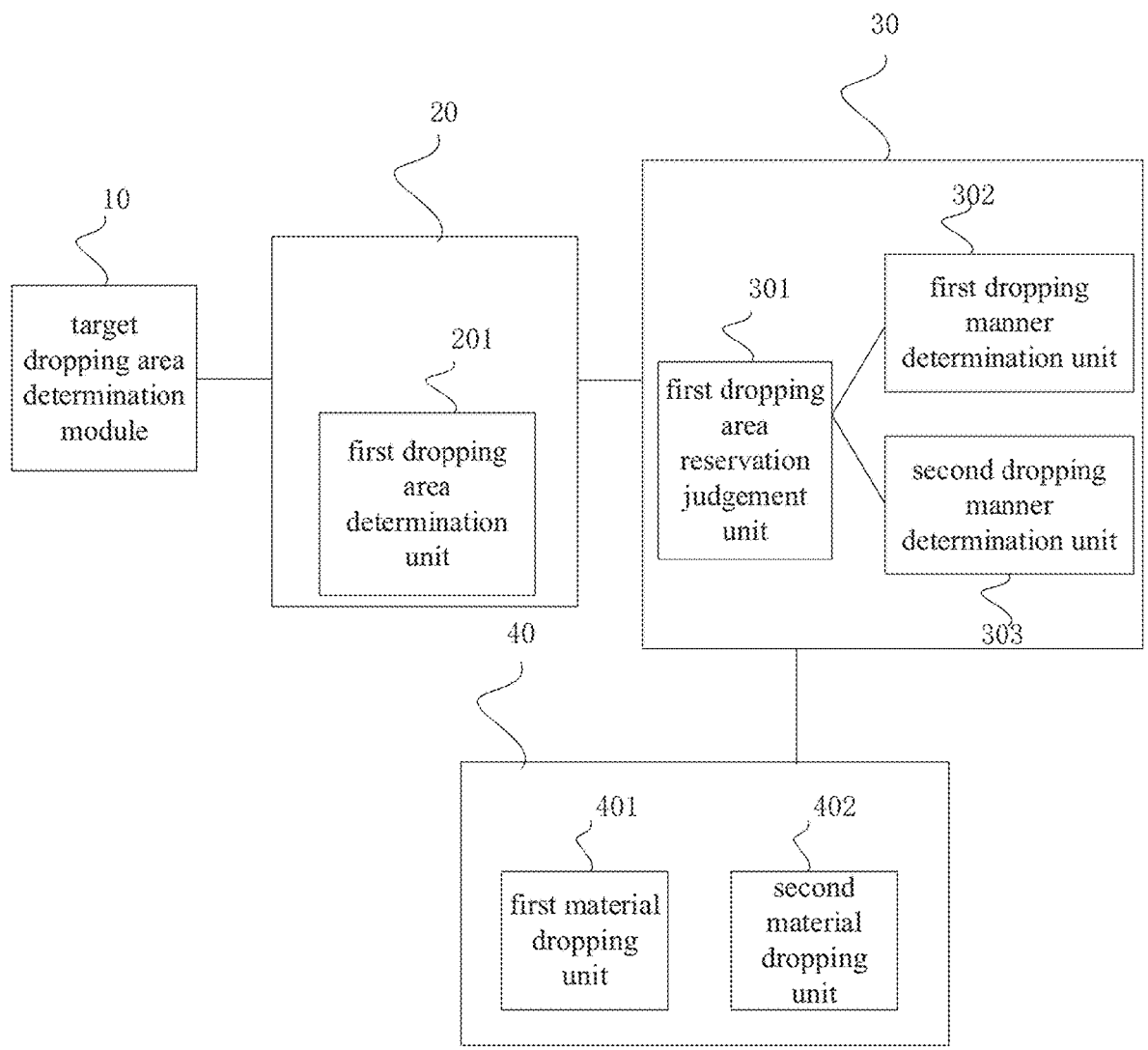
FIG. 7 is another structure diagram showing a material dropping control device provided by an embodiment of the present invention.

In an implementation, as shown in FIG. 7, the motion trajectory determination module 20 includes:

a first dropping area determination unit 201, used for: when the current dropping area and the target dropping area are adjacent, determining the motion trajectory passing through the current dropping area, the target dropping area, and an end dropping area where the motion of the material dropping apparatus stops.

In an implementation, as shown in FIG. 7, the material dropping manner determination module 30 includes:

a first dropping area reservation judgement unit 301, used for judging whether the target dropping area and the end dropping area where the motion of the material dropping apparatus stops are occupied by reservation:

a first dropping manner determination unit 302, used for selecting the material dropping manner to be a first linear dropping manner, when both the target dropping area and the end dropping area are not occupied by reservation, and when the motion trajectory is parallel to a material dropping hole of the material storage device.

In an implementation, as shown in FIG. 7, the material dropping module 40 comprises:

a first material dropping unit 401, used for, when the material dropping manner is the first linear dropping manner, controlling the material conveying device of the material dropping apparatus to drop the materials into the target material storage device while passing over the target material storage device, the material conveying device drops the materials into the target material storage device as the material dropping apparatus moves from the current dropping area to the end dropping area.

In an implementation, as shown in FIG. 7, the material dropping manner determination module 30 further includes:

a second dropping manner determination unit 303, used for selecting the material dropping manner to be a second linear dropping manner, when the end dropping area is occupied by reservation, the target dropping area is not occupied by reservation, and when the motion trajectory is parallel to a material dropping hole of the material storage device.

In an implementation, as shown in FIG. 7, the material dropping module 40 further includes:

a second material dropping unit 402, used for controlling the material conveying device to drop the materials into the target material storage device as the material dropping apparatus moves from the current dropping area to the target dropping area, when the material dropping manner is the second linear dropping manner.

Figure 8:
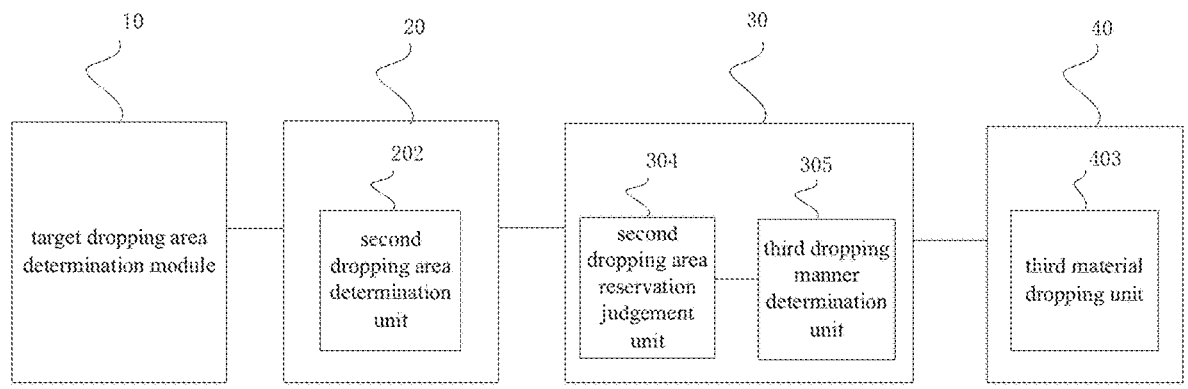
FIG. 8 is another structure diagram showing a material dropping control device provided by an embodiment of the present invention.

In an implementation, as shown in FIG. 8, the motion trajectory determination module 20 includes:

a second dropping area determination unit 202, used for the motion trajectory passing through the current dropping area, a non-target dropping area, and the target dropping area, when there exist at least a non-target dropping area between the current dropping area and the target dropping area.

In an implementation, as shown in FIG. 8, the material dropping manner determination module 30 includes:

a second dropping area reservation judgement unit 304, used for judging whether the target dropping area and the non-target dropping area are occupied by reservation;

a third dropping manner determination unit 305, used for selecting the material dropping manner to be a rotary dropping manner, when both the target dropping area and the non-target dropping area are not occupied by reservation, and when the motion trajectory is perpendicular to a topology diagram comprised of material dropping holes of the respective material storage devices.

In an implementation, as shown in FIG. 8, the material dropping module 40 includes:

a third material dropping unit 403, used for dropping, in the target dropping area, the materials into the target material storage device by controlling the material conveying device to rotate, when the material dropping manner is the rotary dropping manner.

Figure 9:
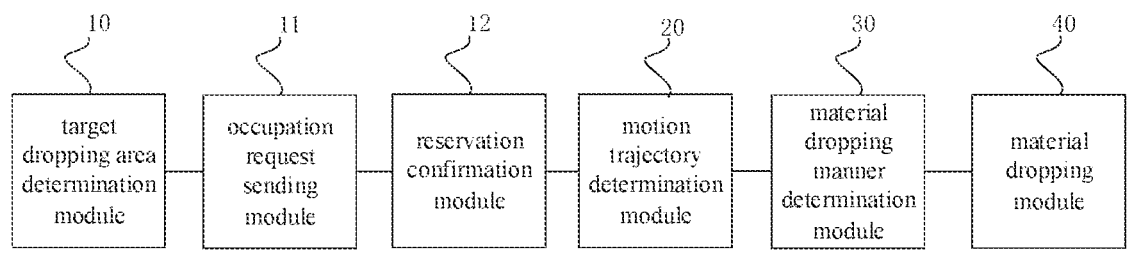
FIG. 9 is another structure diagram showing a material dropping control device provided by an embodiment of the present invention.

In an implementation, as shown in FIG. 9, the material dropping control device further includes:

a reservation sending module 11, used for sending, by the material dropping apparatus, a reservation request for the material dropping apparatus to occupy the target dropping area to a server;

a reservation confirmation module 12, used for receiving, by the material dropping apparatus, an indication from the server to accept the reservation request, and to allow the material dropping apparatus to occupy the target dropping area if the target dropping area is not occupied by reservation.

Embodiment 4

In a specific implementation, a material dropping system is provided, including:

a plurality of material storage devices, wherein each of the material storage devices corresponds to a dropping area;

a plurality of material dropping apparatuses as described in the embodiment 1, wherein the plurality of material dropping apparatuses are used for moving to target dropping areas based on respective corresponding target tasks, and dropping materials into the target material storage devices;

a server used for receiving reservation requests for occupying the target dropping areas sent from respective material dropping apparatuses, recording corresponding request time, generating information for allowing occupying the target dropping areas or information for rejecting occupying the target dropping area based on respective request time, and sending the information for allowing occupying the target dropping areas or the information for rejecting occupying the target dropping area to the respective corresponding material dropping apparatuses.

In the description of the present specification, descriptions with reference to the terms "one embodiment", "some embodiments", "examples", "specific examples", or "some examples", and the like mean that specific characteristics, structures, materials, or features described in conjunction with the embodiment or example are included in at least one embodiment or example of the present application. Moreover, the described specific characteristics, structures, materials or features can be combined in any one or more embodiments or examples in a suitable manner. In addition, those skilled in the art can join and combine different embodiments or examples and the characteristics of the different embodiments or examples described in the specification without mutual contradiction.

In addition, the terms "first" and "second" are merely used for descriptive purposes, and cannot be understood as indicating or implying relative importance or implicitly indicating the number of indicated technical characteristics. Thus, the characteristics defined with "first" and "second" may explicitly or implicitly include at least one of the characteristics. In the description of the present application, "a plurality of" means two or more than two, unless otherwise specifically defined.

Any process or method description in the flow diagrams or described in other ways herein can be understood as a module, segment or part of code that includes one or more executable instructions for implementing specific logical functions or steps of the process. Further, the scope of preferred implementation manners of the present application includes additional implementations, wherein functions can be performed out of the order shown or discussed, including in a substantially simultaneous manner or in reverse order based on functions involved. It should be understood by those skilled in the art to which the embodiments of the present application belong.

The logic and/or steps represented in the flow diagrams or described in other ways herein, for example, can be considered as a sequencing list of executable instructions for implementing logic functions, and can be embodied in any computer-readable medium for use by instruction execution systems, devices, or equipment (such as computer-based systems, systems including processors, or other systems that can fetch and execute instructions from the instruction execution systems, devices, or equipment), or is used in combination with the instruction execution systems, devices or equipment. For the specification, the "computer-readable medium" can be any device that can contain, store, communicate, propagate, or transmit a program for use by the instruction execution systems, devices, or equipment or is used in in combination with the instruction execution systems, devices, or equipment. More specific examples (non-exhaustive list) of the computer-readable medium include the following: an electrical connecting piece (electronic device) with one or more wiring, a portable computer disk case (magnetic device), a random-access memory (RAM), a read-only memory (ROM), an erasable and editable read-only memory (EPROM or flash memory), a fiber optic device, and a portable read-only memory (CDROM). In addition, the computer-readable medium may even be paper or other suitable media on which the program can be printed; and for example, the paper or other media can be optically scanned, then editing and interpreting are performed, or the paper or other media can be treated in other suitable manner if necessary so as to electronically obtain the program, and then the program is stored in the computer memory.

It should be understood that each part of the present application can be implemented by hardware, software, firmware or a combination thereof. In the above embodiments, multiple steps or methods can be implemented by software or firmware stored in a memory and executed by a suitable instruction execution system. For example, if each part of the present application is implemented by hardware, as in another implementation manner, it can be implemented by any one or a combination of the following technologies known in the art, a discrete component logic circuit with a logic gate circuit for implementing logic functions on data signals, an application-specific integrated circuit with a suitable combinatorial logic gate circuit, a programmable gate array (PGA), a field programmable gate array (FPGA), etc.

Those ordinarily skilled in the art can understand that all or part of the steps carried in the method of the foregoing embodiment can be implemented by a program instructing relevant hardware to complete, and the program can be stored in the computer-readable storage medium. When executed, the program includes one of the steps of the method embodiment or a combination of the steps.

In addition, functional units in the various embodiments of the present application may be integrated into one processing module, or each unit may exist alone physically, or two or more than two units may be integrated into one module. The above-mentioned integrated module can be implemented in the form of hardware or a software function module. If the integrated module is implemented in the form of the software function module and is sold or used as an independent product, the integrated module may also be stored in the computer-readable storage medium. The storage medium may be a read-only memory, a magnetic disk or an optical disk, etc.

The above is only specific implementation manner of the present application, but the protection scope of the present application is not limited to this. Any technical personnel familiar with the present technical field can easily think of various changes or substitutes within the technical scope disclosed in the present application, which should be covered within the protection scope of the present application. Therefore, the protection scope of the present application should be subject to the protection scope of the claims.

What is claimed is:

1. A material dropping method, comprising:
   selecting a target dropping area from a plurality of dropping areas, wherein the target dropping area corresponds to a target material storage device selected from a plurality of material storage devices used for storing materials;
   determining a motion trajectory of a material dropping apparatus based on locations of a current dropping area and the target dropping area; wherein the motion trajectory is a virtual path comprised of all dropping areas through which the material dropping apparatus passes; the current dropping area is a dropping area where the material dropping apparatus is currently located; the target dropping area is a dropping area corresponding to the material storage device where the material dropping apparatus will put or drop the materials;
   selecting a material dropping manner based on a positional relationship between the motion trajectory of the material dropping apparatus and the material storage devices corresponding to respective dropping areas, when the respective dropping areas through which the motion trajectory passes are not occupied by reservation, wherein the material dropping manner is a linear dropping manner, when the motion trajectory of the material dropping apparatus is parallel to a topology diagram comprised of material dropping holes of the material storage devices corresponding to the respective dropping areas, or the material dropping manner is a rotary dropping manner, when the motion trajectory of the material dropping apparatus is perpendicular to the topology diagram comprised of the material dropping holes of the material storage devices; wherein the linear dropping manner is that the material dropping apparatus moves along the respective dropping areas, and puts the materials into respective passing the material storage devices while moving; the rotary dropping manner is that the material dropping apparatus stop in the dropping area for dropping the materials, and put the materials into the material storage devices by rotating a material conveying device on the material dropping apparatus; and
   dropping the materials into the target material storage device based on the selected material dropping manner.

2. The method of claim 1, wherein
   when the current dropping area and the target dropping area are adjacent, the motion trajectory passes through the current dropping area, the target dropping area, and an end dropping area where the motion of the material dropping apparatus stops.

3. The method of claim 2, wherein selecting the material dropping manner based on the positional relationship between the motion trajectory and the target material storage device, when respective dropping areas through which the motion trajectory passes are not occupied by reservation, comprises:
   sending a reservation request by the material dropping apparatus for a target dropping area to a server;
   determining, by the server, whether the target dropping area is occupied by reservation;
   judging whether the target dropping area and the end dropping area where the motion of the material dropping apparatus stops are occupied by reservation;
   selecting the material dropping manner to be a first linear dropping manner, when both the target dropping area and the end dropping area are not occupied by reservation, and the motion trajectory is parallel to a topology diagram comprised of material dropping holes of the respective material storage devices;
   wherein the first linear dropping manner is: controlling the material conveying device of the material dropping apparatus to drop the materials into the target material storage device while passing over the target material storage device, the material conveying device drops the materials into the target material storage device as the material dropping apparatus moves from the current dropping area to the end dropping area.

4. The method of claim 3, wherein after judging whether the target dropping area and the end dropping area where the motion of the material dropping apparatus stops are occupied by reservation, the method further comprises:
   selecting the material dropping manner to be a second linear dropping manner, when the end dropping area is occupied by reservation, the target dropping area is not occupied by reservation, and when the motion trajectory is parallel to the topology diagram comprised of material dropping holes of the respective material storage devices;
   wherein the second linear dropping manner is: controlling the material conveying device to drop the materials into the target material storage device as the material dropping apparatus moves from the current dropping area to the target dropping area.

5. The method of claim 1, wherein
   when there exists at least one non-target dropping area between the current dropping area and the target dropping area, the motion trajectory passes through the current dropping area, a non-target dropping area, and the target dropping area.

6. The method of claim 5, wherein selecting the material dropping manner based on the positional relationship between the motion trajectory of the material dropping apparatus and the target material storage device, when the respective dropping areas through which the motion trajectory passes are not occupied by reservation, comprises:
sending a reservation request by the material dropping apparatus for a target dropping area to a server;
determining, by the server, whether the target dropping area is occupied by reservation;
judging whether the target dropping area and the non-target dropping area are occupied by reservation;
selecting the material dropping manner to be a rotary dropping manner, when both the target dropping area and the non-target dropping area are not occupied by reservation, and when the motion trajectory is perpendicular to a topology diagram comprised of material dropping holes of the respective material storage devices;
wherein the rotary dropping manner is: dropping, in the target dropping area, the materials into the target material storage device by controlling the material conveying device to rotate.

7. The method of claim 1, wherein before selecting the material dropping manner based on the positional relationship between the motion trajectory and the target material storage device,
when the respective dropping areas through which the motion trajectory passes are not occupied by reservation, the method further comprises:
sending, by the material dropping apparatus, a reservation request for the material dropping apparatus to occupy the target dropping area to a server; and
receiving, by the material dropping apparatus, an indication from the server to accept the reservation request, and to allow the material dropping apparatus to occupy the target dropping area.

8. A material dropping control device, comprising:
at least one processor; and
a memory communicatively connected to the at least one processor, wherein
the memory stores instructions executable by the at least one processor, and the instructions, when executed by the at least one processor, enable the at least one processor to perform operations of:
selecting a target dropping area from a plurality of dropping areas, wherein the target dropping area corresponds to a target material storage device selected from a plurality of material storage devices used for storing materials;
determining a motion trajectory of a material dropping apparatus based on locations of a current dropping area and the target dropping area; wherein the motion trajectory is a virtual path comprised of all dropping areas through which the material dropping apparatus passes; the current dropping area is a dropping area where the material dropping apparatus is currently located; the target dropping area is a dropping area corresponding to the material storage device where the material dropping apparatus will put or drop the materials;
selecting a material dropping manner based on a positional relationship between the motion trajectory of the material dropping apparatus and the material storage devices corresponding to respective dropping areas, when the respective dropping areas through which the motion trajectory passes are not occupied by reservation, wherein the material dropping manner is a linear dropping manner, when the motion trajectory of the material dropping apparatus is parallel to a topology diagram comprised of material dropping holes of the material storage devices corresponding to the respective dropping areas, or the material dropping manner is a rotary dropping manner, when the motion trajectory of the material dropping apparatus is perpendicular to the topology diagram comprised of the material dropping holes of the material storage devices; wherein the linear dropping manner is that the material dropping apparatus moves along the respective dropping areas, and puts the materials into respective passing the material storage devices while moving; the rotary dropping manner is that the material dropping apparatus stop in the dropping area for dropping the materials, and put the materials into the material storage devices by rotating a material conveying device on the material dropping apparatus; and
dropping the materials into the target material storage device based on the selected material dropping manner.

9. The device of claim 8, wherein
when the current dropping area and the target dropping area are adjacent, the motion trajectory passes through the current dropping area, the target dropping area, and an end dropping area where the motion of the material dropping apparatus stops.

10. The device of claim 9, wherein the selecting the material dropping manner based on the positional relationship between the motion trajectory and the target material storage device, when the respective dropping areas through which the motion trajectory passes are not occupied by reservation, comprises:
sending a reservation request by the material dropping apparatus for a target dropping area to a server;
determining, by the server, whether the target dropping area is occupied by reservation;
judging whether the target dropping area and the end dropping area where the motion of the material dropping apparatus stops are occupied by reservation;
selecting the material dropping manner to be a first linear dropping manner, when both the target dropping area and the end dropping area are not occupied by reservation, and the motion trajectory is parallel to a topology diagram comprised of material dropping holes of the respective material storage devices.

11. The device of claim 10, further comprising a material conveying device coupled to the material dropping apparatus,
wherein the instructions, when executed by the at least one processor, enable the at least one processor to further perform an operation of:
when the material dropping manner is the first linear dropping manner, controlling the material conveying device of the material dropping apparatus to drop the materials into the target material storage device while passing over the target material storage device, the material conveying device drops the materials into the target material storage device as the material dropping apparatus moves from the current dropping area to the end dropping area.

12. The device of claim 11, wherein the instructions, when executed by the at least one processor, enable the at least one processor to further perform an operation of:
selecting the material dropping manner to be a second linear dropping manner, when the end dropping area is occupied by reservation, the target dropping area is not occupied by reservation, and when the motion trajectory is parallel to the topology diagram comprised of material dropping holes of the respective material storage devices.

13. The device of claim 12, wherein the instructions, when executed by the at least one processor, enable the at least one processor to further perform an operation of:
when the material dropping manner is the second linear dropping manner, controlling the material conveying device to drop the materials into the target material storage device as the material dropping apparatus moves from the current dropping area to the target dropping area.

14. The device of claim 8, wherein
when there exist at least a non-target dropping area between the current dropping area and the target dropping area, the motion trajectory passes through the current dropping area, a non-target dropping area, and the target dropping area.

15. The device of claim 14, wherein the selecting the material dropping manner based on the positional relationship between the motion trajectory and the target material storage device, when the respective dropping areas through which the motion trajectory passes are not occupied by reservation, comprises:
sending a reservation request by the material dropping apparatus for a target dropping area to a server;
determining, by the server, whether the target dropping area is occupied by reservation;
judging whether the target dropping area and the non-target dropping area are occupied by reservation; and
selecting the material dropping manner to be a rotary dropping manner, when both the target dropping area and the non-target dropping area are not occupied by reservation, and when the motion trajectory is perpendicular to the topology diagram comprised of the material dropping holes of the material storage devices.

16. The device of claim 15, wherein the instructions, when executed by the at least one processor, enable the at least one processor to further perform an operation of:
when the material dropping manner is the rotary dropping manner, dropping, in the target dropping area, the materials into the target material storage device by controlling the material conveying device to rotate.

17. The device of claim 8, wherein the instructions, when executed by the at least one processor, enable the at least one processor to further perform operations of:
sending, by the material dropping apparatus, a reservation request for the material dropping apparatus to occupy the target dropping area to a server; and
receiving, by the material dropping apparatus, an indication from the server to accept the reservation request, and to allow the material dropping apparatus to occupy the target dropping area when the target dropping area is not occupied by reservation.

18. A material dropping apparatus, comprising a moving base, a stand column, a material conveying device, and the material dropping control device of claim 8, wherein
an upper end of the stand column is connected to the material conveying device and a lower end of the stand column is connected to the moving base respectively, and the material conveying device is used for dropping the materials into the material storage device.

19. A material dropping system, comprising:
a plurality of material storage devices, wherein each of the material storage devices corresponds to a dropping area;
a plurality of material dropping apparatuses of claim 18, wherein the plurality of material dropping apparatuses are used for moving to target dropping areas based on respective corresponding target tasks, and dropping materials into the target material storage devices; and
a server used for receiving reservation requests for occupying the target dropping areas sent from respective material dropping apparatuses, recording corresponding request time, generating information for allowing occupying the target dropping areas or information for rejecting occupying the target dropping area based on respective request time, and sending the information for allowing occupying the target dropping areas or the information for rejecting occupying the target dropping area to the respective corresponding material dropping apparatuses.

* * * * *